United States Patent [19]

Capps

[11] Patent Number: 4,924,346

[45] Date of Patent: May 8, 1990

[54] GAS DISCHARGE SURGE SUPPRESSOR FOR A TELEPHONE LINE

[75] Inventor: John W. Capps, Atlanta, Ga.

[73] Assignee: Hayes Microcomputer Products, Inc., Norcross, Ga.

[21] Appl. No.: 346,577

[22] Filed: May 2, 1989

[51] Int. Cl.[5] .................. H02H 9/06

[52] U.S. Cl. .................. 361/117; 316/119; 316/120; 313/596; 313/643

[58] Field of Search .................. 361/117, 118, 119, 120; 313/306, 307, 308, 595, 596, 602, 603, 623, 624, 625, 637, 643

[56] References Cited

U.S. PATENT DOCUMENTS

| | | | |
|---|---|---|---|
| 4,433,354 | 2/1984 | Lange et al. | 361/120 |
| 4,628,399 | 12/1986 | Shigemori et al. | 313/602 X |
| 4,644,441 | 2/1987 | Igarashi | 361/120 |

FOREIGN PATENT DOCUMENTS

| | | | |
|---|---|---|---|
| 2084393 | 4/1982 | United Kingdom | 361/120 |

*Primary Examiner*—Derek S. Jennings
*Attorney, Agent, or Firm*—Jones, Askew & Lunsford

[57] ABSTRACT

A gas discharge device is provided for protecting a telephone line from certain voltage surges. The gas discharge device provides low voltage surge protection from tip to ring but still retains higher voltage surge protection from tip or ring to ground. The device is a three terminal device constructed with a rod extending from the tip or ring toward the other tip or ring to control the electrical distance between the tip or ring. The ground element may be positioned at the other end of the device or it may be positioned intermediate the tip and ring so that the rod extends through an opening in the ground conductor. In either position, the distance between tip or ring and ground is greater than the distance between tip and ring, and thus the breakdown voltage is higher.

12 Claims, 2 Drawing Sheets

GAS DISCHARGE SURGE SUPPRESSOR FOR A TELEPHONE LINE

TECHNICAL FIELD

This invention relates generally to surge suppressors, and more particularly relates to a gas discharge surge suppressor for protecting a telephone line and connected equipment from certain voltage surges.

BACKGROUND OF THE INVENTION

Electrical and electronic equipment and components are designed to operate effectively within a specified range of voltages. Disturbances in an electrical system can create voltage surges which adversely affect the operation of electrical equipment. Such voltage surges can damage sensitive components or produce noise or other undesirable characteristics in an electrical device. Accordingly, it will be appreciated that it would be highly desirable to protect sensitive equipment from voltage surges so that the equipment operates without damage or interruption.

Modern telephones, modems, and other electronic devices that connect to telephone lines are susceptible to damage or faulty operation from voltage surges. A voltage surge can occur when lightning strikes a telephone line or when voltages are induced in the telephone line from nearby equipment such as motors and faulty electrical equipment.

A typical telephone line has a lightning arrestor to protect the inside telephone wiring and instruments from high voltage surges that occur when lightning stikes the telephone line. While such lightning arrestors are effective in preventing high voltage surges from reaching the internal wiring and instruments connected thereto, they are inadequate to protect the telephone instruments and inside wiring from the lower voltage power surges which are also capable of damaging electronic instruments. Accordingly, it will be appreciated that it would be highly desirable to provide low voltage surge protection for the telephone instrument and inside wiring.

Gas discharge surge suppressors are standard in many applications. However, the construction of conventional three-terminal gas discharge devices is such that the breakdown voltage between the tip and ring terminals is greater than the breakdown voltage between the tip and ground terminals and the breakdown voltage between the ring and ground terminals. Most of the devices normally connected to a telephone line can withstand significant tip-to-ground voltages and ring-to ground voltages but are frequently unable to survive the application of a large tip-to-ring voltage. Therefore, conventional three-terminal gas discharge devices do not provide the lower breakdown voltage between the terminals which are least able to withstand the higher voltage. Therefore, it is desirable to have a gas discharge surge suppressor which has a tip-to-ring breakdown voltage which is less than the tip-to-ground breakdown voltage and the ring-to-ground breakdown voltage.

Varistors, zeners, and other similar electronic devices provide surge protection but, because of the constant breakdown voltage of these devices, the internal heating caused by surge absorption can exceed their heat dissipation capability, especially with repeated surges.

Some surge protectors are bulky items unsuitable for location within or near the equipment it protects. Also, some surge protectors are not aesthetically pleasing. It is desirable to have a compact gas discharge surge suppressor for a telephone line that can be incorporated into telephone instruments, modems, and other devices that are connected to the line. It is also desirable to have a surge suppressor that can be added to existing telephone lines to provide protection from low level voltage surges.

SUMMARY OF THE INVENTION

The present invention is directed to overcoming the problems set forth above. Briefly summarized, according to one aspect of the present invention, a gas discharge device comprises first and second spaced apart electrically conductive elements and an insulating element, positioned between the first and second electrically conductive elements, defining a chamber therebetween. An electric current flows from one of the conductive elements through the chamber to the other conductive element in response to a preselected voltage difference existing between the first and second elements.

The breakdown voltage of the gas discharge device is controlled by the spacing between the first and second conductive elements, the type of gas used, the gas pressure, and the presence, if desired, of an ionizing agent, such as a radioactive gas, and can be appropriately selected for the equipment to be protected. One of the conductive elements is connected to the tip side of the telephone line while the other conductive element is connected to the ring side to protect against voltage surges. The telephone line and equipment connected thereto are then protected against voltage surges above a certain level as determined by the spacing between the first and second conductive elements.

According to another aspect of the invention, the gas discharge device comprises first, second and third conductive elements that are spaced one from the other and define two chambers. The conductive elements are arranged so that the spacing between two of the conductive elements is less than the spacing between either of these first two elements and the third conductive element. For a telephone line, two of the conductive elements are connected to the tip and ring sides of the line while the third conductive element is connected to ground. By having less space between the conductive elements connected to the tip and ring than between either of the conductive elements connected to the tip and ring and the grounded conductive element, the breakdown voltage from tip to ring is less than the breakdown voltage from tip or ring to ground.

It is an object of the present invention to provide a gas discharge device that is responsive to preselected low voltage surges to protect devices attached to a telephone line. This object is achieved by spacing the first and second conductive elements one from the other, and using a conductive element attached to one of the first and second elements to vary the electrical distance between the first and second conductors to thereby control the breakdown voltage.

Another object of the invention is to provide a first breakdown voltage from tip to ring and a second higher breakdown voltage from tip or ring to ground. This object is achieved by providing a third conductive element whose electrical distance from both tip and ring is approximately the same and provides a second, higher level breakdown voltage while the electrical distance between tip and ring is smaller to provide the lower breakdown voltage.

Placing the conductive elements attached to the tip and ring at opposite ends of the gas discharge device and placing the grounded conductive element equidistant between the two end elements provides the desired voltage breakdown levels. The distance between the end elements is adjusted by using a conductive element attached to one of the end elements that protrudes in the chamber towards the other end element.

The desired breakdown voltages can also be obtained by locating the conductive elements connected to the tip side and ring side of the line near one end of the surge suppressor, yet spaced from each other, and locating the grounded conductive element at the opposite end of the structure. The elements at the end of the structure are circular plates, and the element located between these two elements has an annular or ring shape. A conductive element extends from the tip or ring conductive element at one end of the structure in the chamber toward the other of the tip or ring that is centrally located between the end elements. This facilitates adjusting the electrical distance between tip and ground or ring and ground so that the breakdown voltages to ground are the same, while, at the same time, the diameter of this conductive element determines the space, and thus the breakdown voltage, between the tip and ring.

These and other aspects, objects, features and advantages of the present invention will be more clearly understood and appreciated from a review of the following detailed description of the preferred embodiments and appended claims and by reference to the accompanying drawing.

DETAILED DESCRIPTION OF THE PREFERRED EMBODIMENTS

Figure 1:
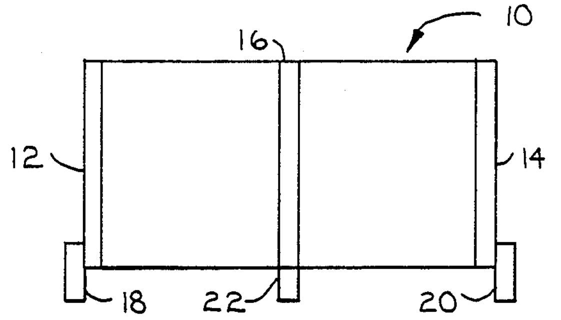
FIG. 1 is a simplified plan view of a preferred embodiment of a gas discharge surge suppressor in accordance with the present invention.
Figure 2:
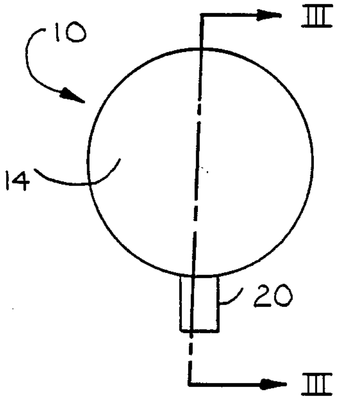
FIG. 2 is a right end view of the gas discharge device of FIG. 1.

Refer now to the drawing, in which like numerals indicate like elements throughout the several figures. FIG. 1 is a simplified plan view of a preferred embodiment of a gas discharge surge suppressor in accordance with the present invention. FIG. 2 is a right end view of the gas discharge device of FIG. 1. The gas discharge device 10 is shown having three electrically conductive elements, a tip element 12, ring element 14 and a ground element 16. It will be understood that the tip element 12 connects to the tip side of a telephone line, the ring element 14 connects to the ring side of the line, and the connections to tip 12 and ring 14 may be interchanged. The surge suppressor 10 is preferably an elongated structure with three terminals extending from its body. The terminals 18, 20 and 22 extend from and are attached to or are part of the tip 12, ring 14, and ground 16 conductive elements, respectively. The body of the surge suppressor 10 may be coated with an insulating material, such as one of the well known epoxy insulating materials, for example, so that the device is mostly insulated with only the terminals 18, 20, and 22, which extend from the body, being uncoated for providing a convenient electrical connection.

Figure 3:
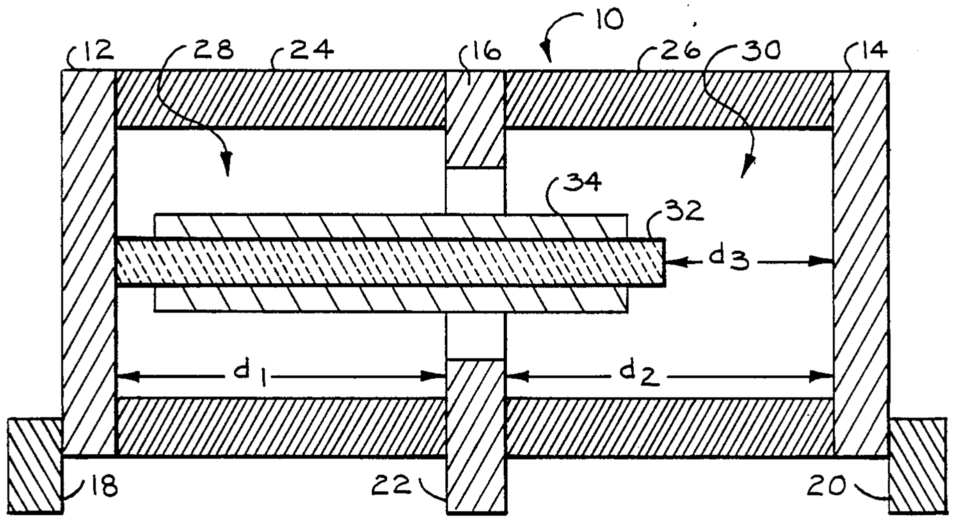
FIG. 3 is a sectional view of the gas discharge device of FIGS. 1 and 2 taken along line III—III of FIG. 2.

FIG. 3 is a simplified sectional view of the gas discharge device of FIGS. 1 and 2 taken along line III—III of FIG. 2. The tip and ring conductors 12, 14, are spaced from each other and are located at opposite ends of the surge suppressor 10. The surge suppressor preferably has an elongated cylindrical configuration and the tip and ring conductors 12, 14 are preferably circular plates that cap the ends of the surge suppressor 10. The ground conductor 16 is positioned intermediate the tip 12 and ring 14 conductors. Preferably, the ground conductor 16 is also a circular element with a circular opening through its center. The conductive elements 12, 14 and 16 can be easily stamped out of a sheet of material such as copper. The sheet material is preferably a copper alloy or an alloy of other appropriate material so as to give characteristics suitable for use in a gas discharge device. Such alloys and materials are well known in the art.

A first insulating element 24 is positioned between the tip 12 and ground 16 conductive elements and a second insulating element 26 is positioned between the ring 14 and ground 16 conductive elements. The insulating elements 24 and 26 may be constructed of the paper or cardboard commonly used in high voltage electrical equipment. The insulating elements 24 and 26 may also be constructed of glass, glass epoxy, epoxy resin, ceramic, or other strong, rigid, durable insulating materials. The insulating elements 24 and 26 each have an open cylindrical configuration and form first and second chambers 28 and 30, respectively, within the gas discharge device 10. The chambers 28, 30 are preferably filled with an inert gas.

A fourth conductive element 32 is shown attached to the tip 12 and extends therefrom through the first chamber 28, through the opening in the ground conductive element 16, and into the second chamber 30. The free end of the fourth conductive element 32 is spaced a preselected distance from the ring plate 14. The fourth conductive element 32 is preferably a rod made from number 42 copper alloy or other appropriate conductive material, and is preferably coated along most of its length with an insulating material such as glass or glass epoxy 34. The ends of rod 32 are left uncoated to provide for attachment to ring plate 12 and to provide for a conductive path into chamber 30.

The distance $d_1$ between the tip plate 12 and ground plate 16 is the same as the distance $d_2$ between the ring plate 14 and ground plate 16. This equivalence of spacing makes the breakdown voltage from tip to ground and ring to ground equal. The spacing is calculated to provide a voltage breakdown from tip to ground and ring to ground of about 900 volts.

The distance $d_3$ between the free end of the conductive rod 32 and the ring plate 14 is smaller than either of the other distances $d_1$, $d_2$ so as to provide a lower breakdown voltage, on the order of about 400 volts, between the tip and ring. It can thus be appreciated that the breakdown voltage between the tip and ring is controlled by the distance $d_3$ which is the electrical distance between the tip plate 12 and the ring plate 14 as controlled by the length of conductive rod 32. The tip to ground or ring to ground breakdown voltage can therefore be adjusted by changing the distance $d_1$ or $d_2$ without interfering with the distance $d_3$.

The conductive rod 32 may be attached to the tip end plate 12 by welding, or it may be pressed into an opening in the tip plate 12, or it may be integrally formed with the tip plate 12. Because the rod 32 will become heated and expand somewhat during conduction, the insulating material should have the same expansion rate as the rod 32 to prevent premature failure of the insulation.

Figure 4:
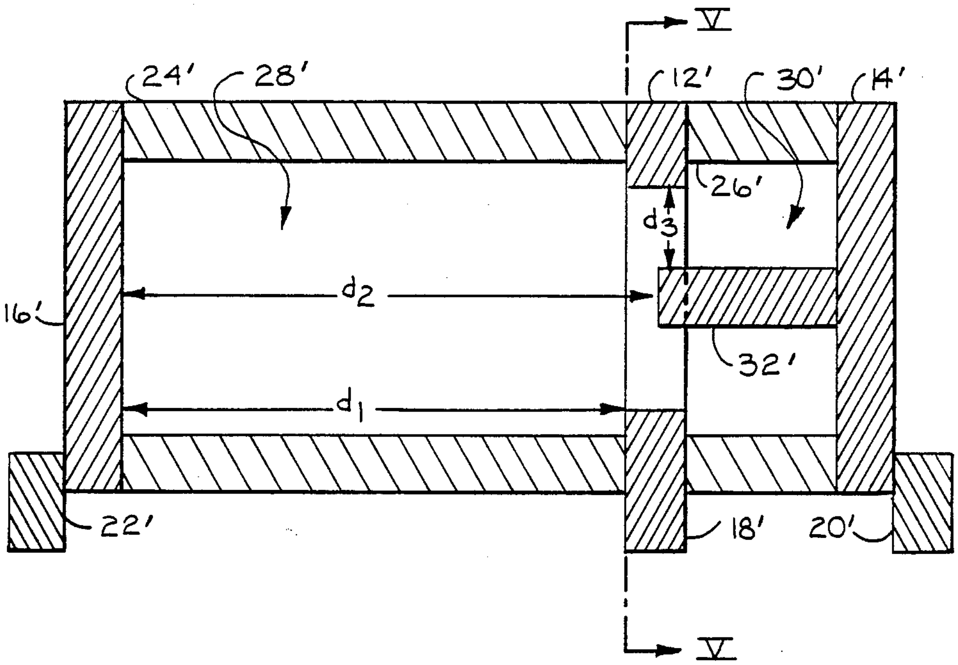
FIG. 4 is a sectional view of another embodiment of the gas discharge device.
Figure 5:
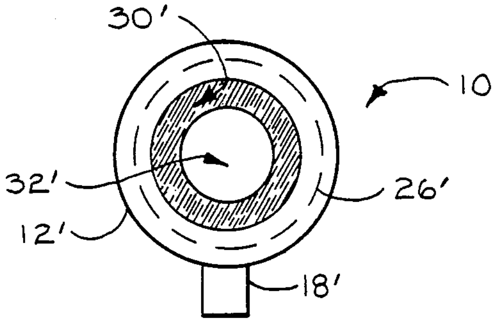
FIG. 5 is a sectional view taken along line V—V of FIG. 4.

Referring now to FIGS. 4 and 5, FIG. 4 is a sectional view of another embodiment of the gas discharge device. FIG. 5 is a sectional view taken along line V—V of FIG. 4. In FIGS. 4 and 5 the elements are numbered as in FIG. 3 but with a (′) added after each number to indicate a different embodiment of the invention. Thus, in FIG. 4, the positions of the tip plate 12′ and ground plate 16′ have been changed so that the ground plate 16′ is physically located on the one end of the gas discharge device 10, while the tip plate 12 is located intermediate the ground conductor 16′ and the ring plate 14′, which is located at the other end of the gas discharge device 10. The conductor rod 32′ is attached to the ring plate 14′ with the free end of the rod 32′ extending through the second chamber 30′ toward the opening in the tip plate 12′. The rod 32′ may be attached to the ring plate 14′ by a bulk weld, press fit, or the rod 32′ and ring plate 14′ may be made as a unitary structure.

The tip plate 12′ has its central opening enlarged so that the tip plate 12′ is not really a plate but is a ring, a washer, or other like structure, concentric with the cylindrical insulating members 24′, 26′. The interior surface of the tip member 12′ may be flush with the interior surfaces of the insulated members 24′, 26′ or made to protrude into the chambers.

The rod 32′ preferably extends so that the free end extends through half the thickness of the tip member 12′. The distance $d_1'$ is the electrical distance from tip to ground and the distance $d_2'$ is the electrical distance from ring to ground. As illustrated in FIG. 4, $d_2'$ is slightly greater than $d_1'$ by about half the thickness of the tip member 12′. The distance of $d_3'$ is the electrical distance between the tip and ring. The distance $d_3'$ is adjusted by varying the inside diameter of the tip element 12′, the outer diameter of rod 32′, or both.

For a given gas the breakdown voltage between tip and ground is controlled by the distance $d_1$, the breakdown voltage between ring and ground is controlled by the distance $d_2$, and the breakdown voltage from tip to ring is controlled by the distance $d_3$. The distance $d_3$ is much smaller than either distance $d_1$ or $d_2$ and thus there is a lower breakdown voltage between tip and ring than between tip and ground or ring and ground. For use with a telephone line, the breakdown voltage between tip and ring is on the order of about 400 volts while the breakdown voltage between either tip and ground or ring and ground is on the order of about 900 volts. Thus, a voltage surge between tip and ring will cause the device to discharge at 400 volts while a voltage surge affecting either the tip and/or the ring with respect to ground will cause the device to discharge at 900 volts. As soon as the voltage reaches the breakdown level the device conducts and protects the equipment connected to the telephone line.

It will be appreciated that once the gas breakdown voltage has been exceeded the gas will become ionized and the voltage required to sustain conduction will be significantly reduced. This has three beneficial results. The first result is that the connected equipment will be subjected to the breakdown voltage only for a very short period, that is, until breakdown and conduction occur. Thereafter the equipment will only be subjected to the lower sustaining voltage. This reduces the overall stress on the equipment.

The second result is that the heat generated in the present invention will be a product of the current and the sustaining voltage, instead of the product of the current and the breakdown voltage. If the source of the surge is similar to a constant current source then the heat generated, and required to be dissipated, will be less for the present invention that the heat generated and required to be dissipated by a constant voltage device, such as a varistor or a zener.

The third result is that once the breakdown voltage between two of the elements is exceeded and the gas becomes ionized, the lower sustaining voltage is all that is required to initiate conduction to the third element. For example, assume that the breakdown voltage is exceeded between the tip and ring conductors 12′ and 14′, respectively, of FIG. 4. The ionized gas will rapidly migrate into chamber 28′, thereby lowering the breakdown voltage between ground conductor 16′ and both the tip 12′ and ring 14′ conductors. Therefore, once any gas breakdown occurs, the maximum voltage between any elements will be the arc sustaining voltage between the elements. This prevents an overvoltage condition between one set of conductors, for example, tip and ring, from causing the breakdown of components connected between one or both of these conductors and the ground conductor.

It can now be appreciated that a gas discharge device has been disclosed for protecting electronic equipment from voltage surges on a telephone line. The gas discharge device can be formed as a three terminal device for connection to the telephone line or equipment to provide a low voltage breakdown between tip and ring and a high voltage breakdown between tip and ground or ring and ground. Both of the breakdown voltages are much lower than the primary voltage surge accompanying a lightning strike on the telephone line. Thus, the voltage surge protector provides protection against low level surges and other spurious voltages as well as the higher voltages, such as those which often accompany a lightning strike.

The device is simple in construction and the breakdown voltages can easily be tailored for a specific application by varying the electrical distances between the elements.

While the device has been shown as a three terminal device, it is easily seen, especially in FIG. 3, that the device can be configured as a two terminal device by deleting ground conductor 16 so that chambers 28 and 30 form a single chamber. With such a two terminal device insulation 34 could be omitted and the breakdown voltage determined by distance $d_3$. Also, insulator 34 and rod 32 could be omitted, in which case the breakdown voltage would be determined by the overall distance ($d_1$ and $d_3$). Such a two terminal device is useful for connecting between tip and ring to protect against voltage surges, especially where a ground connection is not readily available.

Although a vacuum can be used in the chambers, in the preferred embodiment the chambers are filled with a gas so that the breakdown voltage is reduced. Furthermore, it will be appreciated by those skilled in the art that a radioactive isotope may be easily added to the gas so as to further reduce the breakdown voltage. The use of different gases and different levels of radioactive isotopes in the chambers is advantageous in that a single physical size device can be fabricated and the appropriate breakdown voltages determined by the gases and radioactive isotopes placed in the chambers.

It will be appreciate by one skilled in the art that the breakdown voltages are determined not only by the gas, the gas pressure, and the radioactive isotopes, but by dimensions $d_1$, $d_2$, and $d_3$, and also by the distance between the surface of the center pin or rod 32 or 32' and the inner diameter of the intermediate conducting element, such as 16 or 12'. Also, as is well known to those skilled in the art, the breakdown voltage can also be affected, to some degree, by varying the shape of the exposed end of the center pin 32 or 32', such as rounding the exposed end, or sharpening the exposed end to a point.

While the invention has been described with reference to the preferred embodiments, it will be understood by those skilled in the art that various changes may be made and equivalents may be substituted for elements of the preferred embodiments without departing from the invention. Furthermore, although some breakdown voltages have been specified with particularity, the present invention is not limited to those specified voltages. It will be appreciated that other voltages may be desirable or necessary for a particular application and that the present invention also encompasses these other voltages. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications.

What is claimed is:

1. A surge suppressor having a first end and a second end, comprising:

a first electrically conductive element positioned at said first end;

a second electrically conductive element positioned at said second end;

a third electrically conductive element positioned between said first and second electrically conductive elements and being a first predetermined distance from said first electrically conductive element and a second predetermined distance from said second electrically conductive element;

a first insulator positioned between said first and third electrically conductive elements and defining a first chamber; and a second insulator positioned between said second and third electrically conductive elements and defining a second chamber;

a fourth electrically conductive element connected to said first electrically conductive element and extending through said first chamber and an opening in said third electrically conductive element into said second chamber to a third predetermined distance from said second electrically conductive element;

whereby a first breakdown voltage, between said first and third electrically conductive elements, is at least partially determined by said first predetermined distance, a second breakdown voltage, between said second and third electrically conductive elements, is at least partially determined by said second predetermined distance, and a third breakdown voltage, between said first and second electrically conductive elements, is at least partially determined by said third predetermined distance; and wherein said fourth electrically conductive element has a middle portion covered with an insulating material.

2. The surge suppressor of claim 1 wherein said insulating material is glass epoxy.

3. The surge suppressor of claim 1 wherein said insulating material and said fourth electrically conductive element expand at the same rate.

4. The surge suppressor of claim 1 wherein said first and second chambers are filled with a gas, said gas affecting said first and second breakdown voltages.

5. The surge suppressor of claim 1 wherein said first and second chambers are filled with a gas, said gas affecting said first, second and third breakdown voltages.

6. The surge suppressor of claim 4 wherein said gas contains a radioactive isotope.

7. A surge suppressor having a first end and a second end, comprising:

a first electrically conductive element positioned at said first end;

a second electrically conductive element positioned at said second end;

a third electrically conductive element positioned between said first and second electrically conductive elements and being a first predetermined distance from said first electrically conductive element;

a first insulator positioned between said first and third electrically conductive elements and defining a first chamber;

a second insulator positioned between said second and third electrically conductive elements and defining a second chamber;

a fourth electrically conductive element, having a first end connected to said second electrically conductive element, extending through said second chamber, and having a second end positioned in an opening in said third electrically conductive element, said third electrically conductive element and said fourth electrically conductive element being separated by a second predetermined distance;

whereby a first breakdown voltage, between said first and third electrically conductive elements, is at least partially determined by said first predetermined distance, and a second breakdown voltage, between said second and third predetermined elements, is at least partially determined by said second predetermined distance; and wherein said fourth electrically conductive element has a middle portion covered with an insulating material.

8. The surge suppressor of claim 7 wherein said insulating material is glass epoxy.

9. The surge suppressor of claim 7 wherein said insulating material and said fourth electrically conductive element expand at the same rate.

10. The surge suppressor of claim 7 wherein said first and second chambers are filled with a gas, said gas affecting sid first and second breakdown voltages.

11. The surge suppressor of claim 7 wherein said first and second chambers are filled with a gas, said gas affecting said first, second and third breakdown voltages.

12. The surge suppressor of claim 10 wherein said gas contains a radioactive isotope.

* * * * *